Nov. 30, 1926.

A. F. CALLISON 1,608,925

FREIGHT TRANSFER APPARATUS

Filed Dec. 16, 1922

Inventor:
ABNER F. CALLISON
By

Patented Nov. 30, 1926.

1,608,925

UNITED STATES PATENT OFFICE.

ABNER F. CALLISON, OF BUFFALO CREEK, COLORADO.

FREIGHT-TRANSFER APPARATUS.

Application filed December 16, 1922. Serial No. 607,350.

My invention relates to the transfer of freight from car to truck, or to warehouse, platform, or to a barge, etc., and is adapted for systems which utilize unit containers in which the merchandise is shipped and my invention consists in an improved transfer mechanism preferably including a hoist.

The main object of my invention is to provide for the transfer of a container at points where there is not sufficient space to admit of a ramp track for trucks as shown in my copending applications Serial Numbers 566,335 and 590,361.

Another object of my invention is to provide an engagement between the hoist and the container when raising the latter from a truck, which leaves the wheels of the container resting upon supporting members in such a way that the container may be shunted off of the hoist onto any ramp track, or warehouse trackage when the support for the container has been brought into proper alignment with same.

Another object of my invention is to provide flexibility of the supporting track whereby it may be automatically aligned with the bed of a truck or ramp track, or with the rails of a storage track.

In the accompanying drawings which illustrate a selected embodiment of my invention—

Figure 1 is an elevation of my transfer apparatus, the end of a railway car and a ramp track parallel therewith, and the end of an adjacent platform.

Figure 2 is an elevation of my apparatus looking in a direction at right angles to Figure 1.

My apparatus includes overhead rails 1 mounted upon suitable columns 2 upon which a wheeled truck 3 is adapted to move the same with its other element comprising an overhead crane. Truck 3 is provided with upstanding posts 4 and pulleys 5 and 6 are journaled upon posts 4 at the upper ends of the latter, and upon a platform or framework 7 which extends between posts 4 and is supported upon truck 3, either directly, as indicated in the drawings, or, in a raised position, by cables 8 each secured at one end to platform 7, passing over pulleys 6 and around pulleys 5 with their other ends secured to a drum 9 mounted upon platform 7. Drum 9 is driven by a motor 10 through a suitable clutch and a reduction gearing 11 and it will be apparent that as drum 9 is rotated to shorten cables 8 platform 7 will be raised and when the cable is lengthened platform 7 will be lowered.

Pivotally suspended from platform 7 at each side thereof are a plurality of bars 12, the lower ends of which mount an L-shaped track 13 which extends longitudinally of platform 7 and transversely of rails 1. The tracks on opposite sides of the platform are held in fixed parallel relation to each other by means of a spacing bar 14 pivotally connected to opposite bars 12 at a short distance below platform 7 but far enough from tracks 13 to permit passage of a merchandise container A under bars 14.

I desire to propel the crane or truck 3 by the same motor 10 which I utilize for raising and lowering the container trackway and I accomplish this by gearing motor 10 to the axle 15 of the crane through a suitable clutch and a beveled gearing which includes a pinion 16 slidably mounted upon a square shaft 17 and adapted to be moved up and down with platform 7 without being disengaged from the motor drive shaft pinion.

In operation, the transfer truck 3 may be brought over a roadway, parallel with the railroad or warehouse tracks, and a motor truck carrying a merchandise container may be driven between tracks 13. These tracks are curved horizontally at their ends so as to automatically shift to accommodate the entrance of a container between them. It will be understood that the container wheels are spaced apart a greater distance than the width of the truck bed and that the relative heights of the roadway and tracks 13 are such that the container wheels will be above tracks 13. The hoisting mechanism may then be operated to raise tracks 13 and lift the container from the truck. The container is then transferred into alignment with a warehouse track or a ramp track D cooperating with the railroad track to transfer containers to a railroad as described in my above-mentioned applications. The container may be rolled off track 13 on to the receiving track and if tracks 13 are not accurately aligned with the other track the pivotal suspension of tracks 13 will permit them to be shifted slightly to one side or the other so as to accommodate the container.

This moving of the container may be done by hand or mechanical pushing means may be provided as shown in my above-mentioned application Serial No. 590,361.

Obviously the operation may be varied or reversed according to circumstances and in any of the transfer operations the tracks 13 may be raised or lowered to accommodate the surface with which they are to cooperate.

Obviously the various features of my transfer device may be used without being combined with all of the others as shown and modifications in the construction and arrangement of the details of the apparatus may be made without departing from the spirit of my invention as expressed in the appended claims.

I claim:

1. In a freight transfer device, an overhead crane, and a merchandise container track pivotally suspended therefrom to swing only transversely of its length.

2. In a freight transfer device, a traveling overhead crane, and a merchandise container track suspended therefrom so as to swing transversely of its length and longitudinally of the direction of travel of said crane only.

3. In a freight transfer device, an overhead crane, a track pivotally suspended therefrom so as to permit swinging transversely of the longitudinal axis of said suspended track only, and means on said crane for raising and lowering said track.

4. In a freight transfer device, a fixed track, an overhead crane adapted to travel at right angles to said fixed track, a pivotally suspended track depending from said crane and adapted to maintain parallelism with said fixed track, a container movable from said fixed track to said suspended track, and means to provide exact alignment of said suspended track with said fixed track upon such movement of said container.

5. In a freight transfer device, an overhead crane, a frame depending therefrom, and a swinging track carried by said frame extending at right angles to the direction of travel of said crane, the ends of said track being curved outwardly to align it with its load.

6. In a freight transfer device, an overhead crane, a group of rigid parallel members pivotally suspended from one side of said crane so as to swing across the latter, a group of rigid parallel members similarly suspended from the other side of said crane, the members of one group being opposite the members of the other group, a rail carried by the lower ends of the members of each group, and elements connecting opposite members of said groups to maintain their parallelism and the parallelism of said rails.

7. In a freight transfer device, an overhead crane, a group of parallel members pivotally suspended from one side of said crane so as to swing across the latter, a group of parallel members similarly suspended from the other side of said crane, the members of one group being opposite the members of the other group, a rail carried by the lower ends of the members of each group, the ends of which are curved outwardly to properly align said rails upon introduction to their load, and elements connecting opposite members of said groups to maintain their parallelism and the parallelism of said rails.

8. In a freight transfer device, an overhead crane, suspension members at opposite sides thereof, parallel rails carried by the lower ends of said members and extending parallel with the axes of the suspension pivots, and means spaced from said rails for maintaining their parallelism and spacing.

In testimony whereof I hereunto affix my signature this 28th day of Nov., 1922.

ABNER F. CALLISON.